Figure 1:
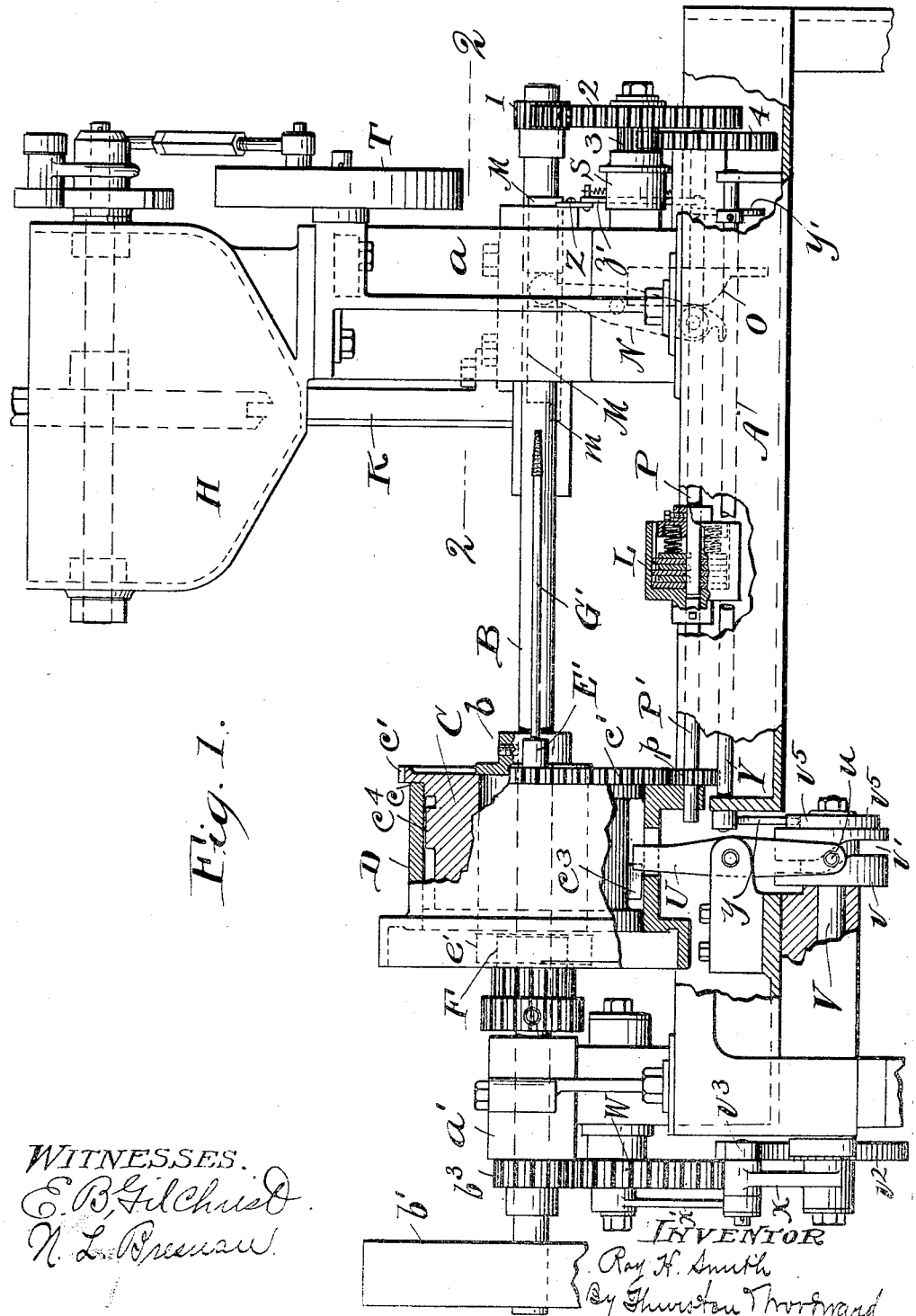

R. H. SMITH.
NUT TAPPING MACHINE.
APPLICATION FILED OCT. 25, 1907.

968,889.

Patented Aug. 30, 1910.

5 SHEETS—SHEET 1.

WITNESSES.
E. B. Gilchrist
N. L. Brennan

INVENTOR
Ray H. Smith
By Thurston & Woodward
Attorneys

R. H. SMITH.
NUT TAPPING MACHINE.
APPLICATION FILED OCT. 25, 1907.

968,889.

Patented Aug. 30, 1910.
5 SHEETS—SHEET 3.

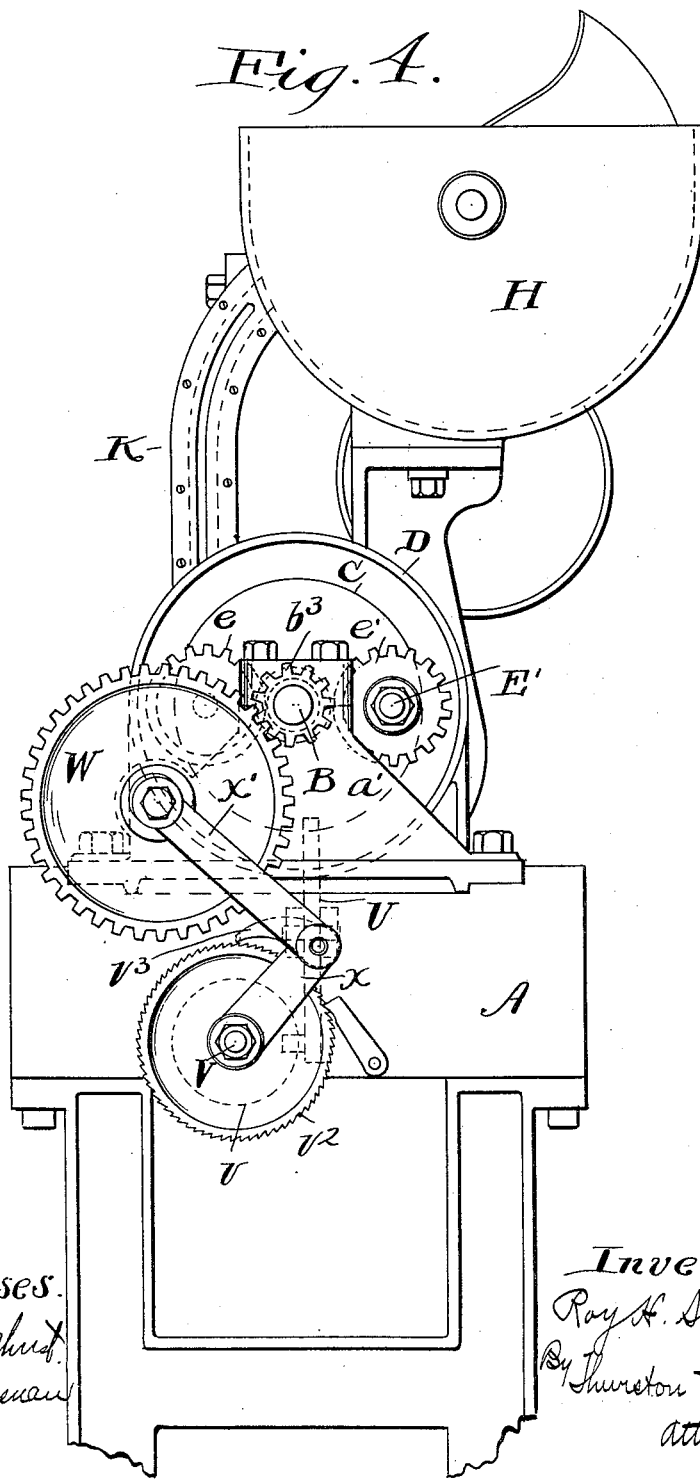

R. H. SMITH.
NUT TAPPING MACHINE.
APPLICATION FILED OCT. 25, 1907.
968,889.
Patented Aug. 30, 1910.
5 SHEETS—SHEET 5.
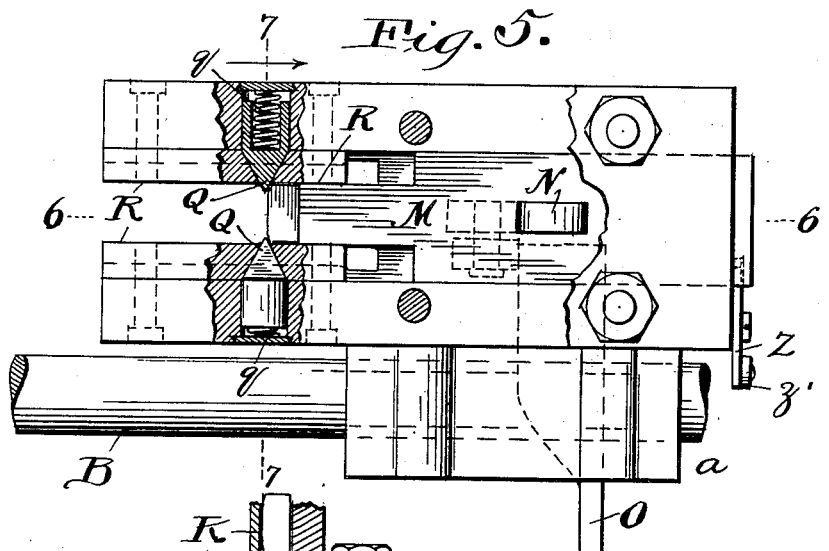
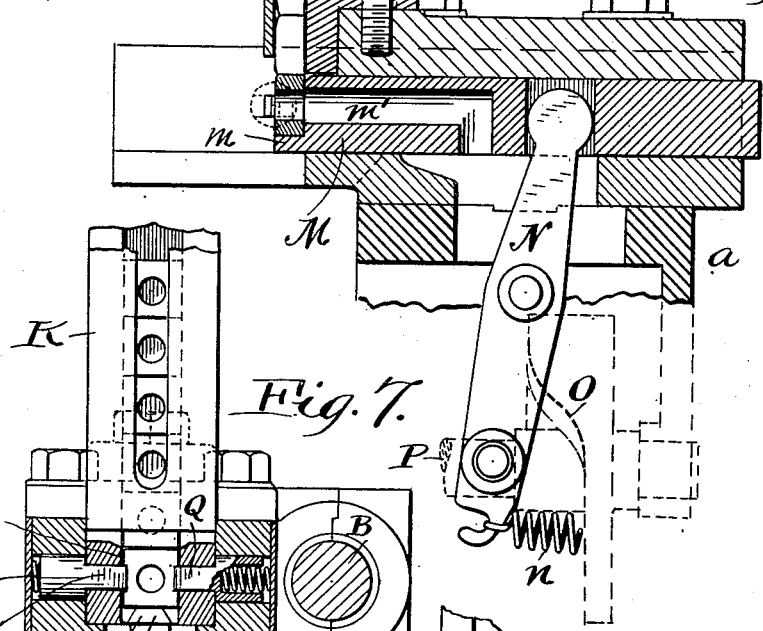
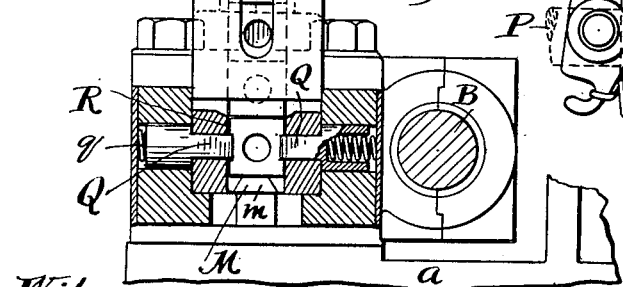

UNITED STATES PATENT OFFICE.

ROY H. SMITH, OF CLEVELAND, OHIO.

NUT-TAPPING MACHINE.

968,889.   Specification of Letters Patent.   Patented Aug. 30, 1910.

Application filed October 25, 1907. Serial No. 399,158.

*To all whom it may concern:*

Be it known that I, ROY H. SMITH, a citizen of the United States, residing at Cleveland, in the county of Cuyahoga and State of Ohio, have invented a certain new and useful Improvement in Nut-Tapping Machines, of which the following is a full, clear, and exact description.

The object of this invention is to provide a novel automatic nut tapping machine of large capacity.

The fundamental novel feature of the invention is the employment of a rotatable head carrying a plurality of rotatable tap spindles, to which taps may be removably secured, combined with means by which the head may be successively held in such positions as will cause the several tap spindles to be presented in turn for engagement with the nuts to be tapped, and with mechanism whereby the tap spindle held in said position will be rotated and the other spindles will be idle.

The invention consists, in addition to the combination of parts above recited, of numerous more specific combinations and sub-combinations of parts which are shown in the drawings and hereinafter described and definitely pointed out in the claims.

Figure 2:
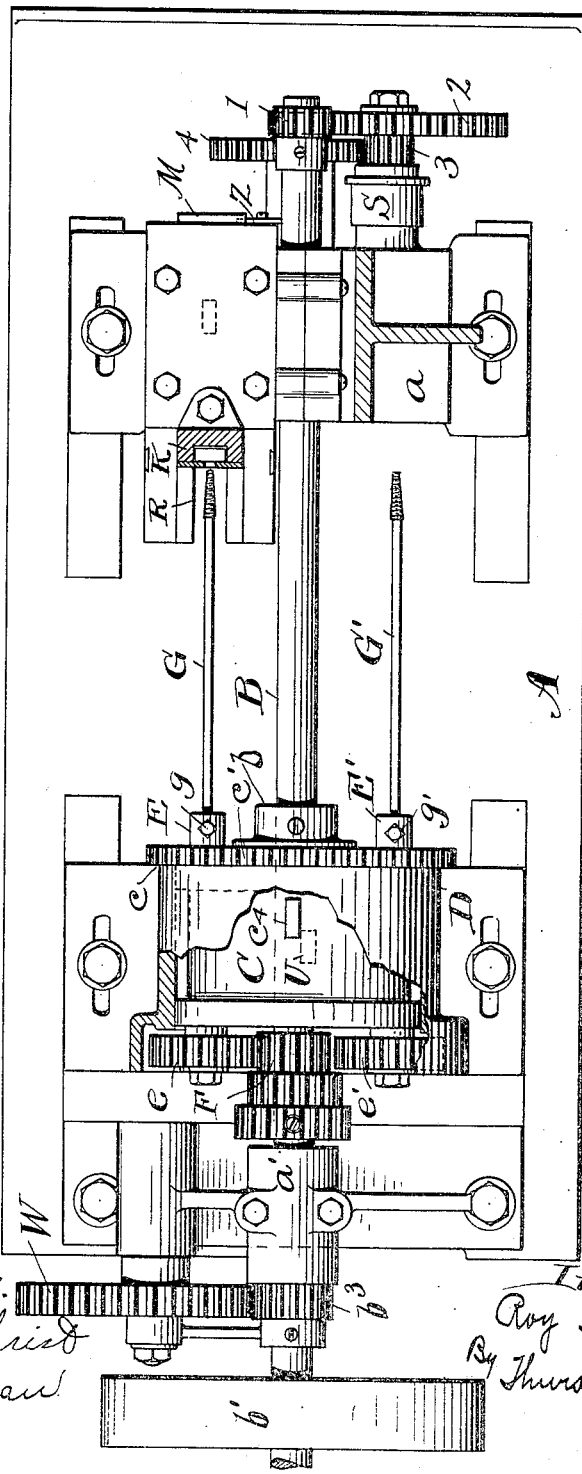
Figure 3:
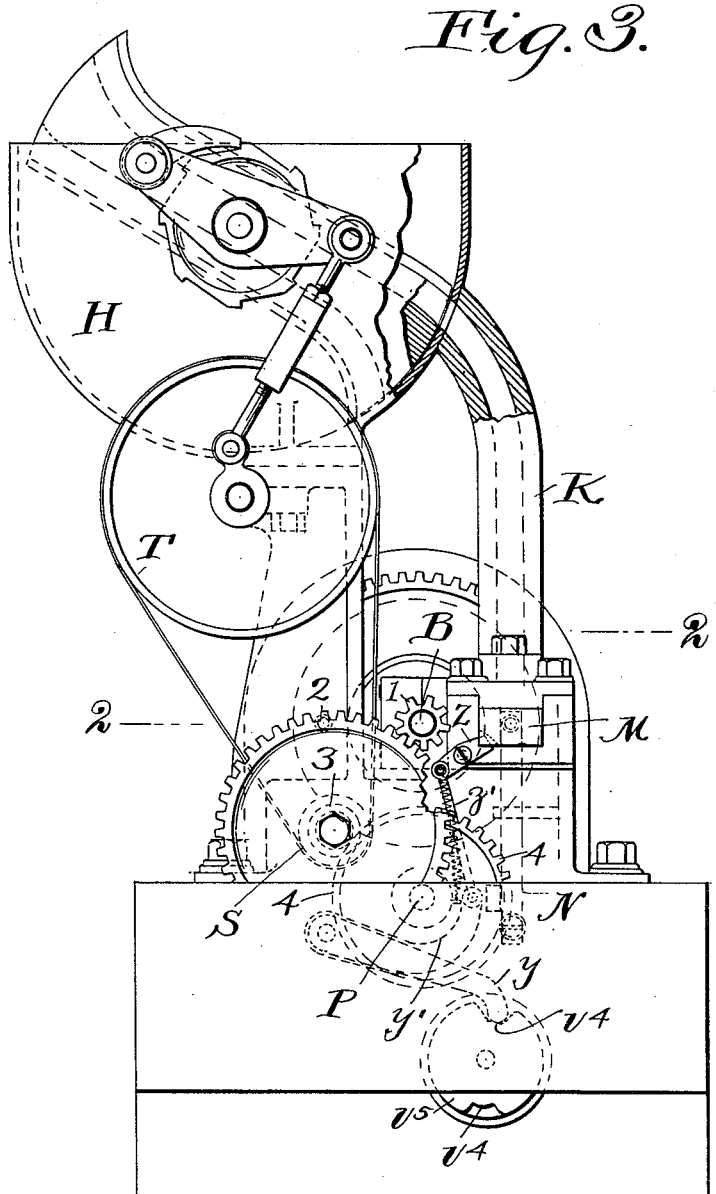

In the drawing, Figure 1 is a front elevation of a machine embodying the invention,—some parts thereof being shown in section. Fig. 2 is a plan view of said machine when the hopper and the feed mechanism therefor have been removed and when the nut blank channel is sectioned in the plane indicated by line 2—2 of Fig. 1. Fig. 3 is an end elevation from the right end of Fig. 1. Fig. 4 is an end elevation from the left end of Fig. 1. Fig. 5 is a plan view of the mechanism for moving the nuts onto the tap. Fig. 6 is a vertical sectional view in the plane of line 6—6 of Fig. 5. Fig. 7 is a sectional view in the plane of line 7—7 of Fig. 5, showing additionally the nut delivery channel.

Referring to the parts by letters, A represents the bed of the machine, and $a$, $a'$ two bearing standards at opposite ends thereof. B represents a spindle rotatably mounted in said bearings which may be driven by a belt pulley $b'$.

C represents a head which surrounds the spindle B, and is rotatable upon an axis which is parallel to but not concentric with the axis of the spindle. As shown the axis of the head is a little in front of the axis of the spindle. This head is rotatably mounted in a fixed housing D; and is prevented from endwise movement in said housing by a flanged collar $b$ fixed to the spindle, and by an annular flange $c$ on the head, which engages with the end of said housing.

In the embodiment of the invention shown in the drawing, two tap spindles E, E' are rotatably mounted in this head,—their axes being parallel to the axis of the housing and equi-distant therefrom. On the rear end of these tap spindles are the pinions $e$, $e'$ of equal size. Fixed to the spindle B is a gear F, which is of such diameter that it will mesh with the pinion ($e$, for example) on the rear tap spindle. Because of the eccentricity of the location of the tap spindles relative to the axis of the gear F, the other pinion $e'$ will not be in engagement with the gear F. Therefore, the front spindle will be idle, and the tap G' carried thereby may be easily removed by loosening screw $g'$, by which said tap is held in said spindle.

The perforated nut blanks may be placed in a hopper H, from which they will preferably be delivered by suitable automatic mechanism (which forms no part of the present invention) into a nut chute K. The lower end of this chute is directly over a shelf $m$ on the forward end of a horizontally movable slide M, when said slide is retracted. The slide is mounted in suitable guide ways in which it is moved backward and forward by a lever N. This lever is rocked so as to retract the slide and bring its shelf $m$ directly under the delivery end of the nut chute by means of a cam O secured on a shaft P. The lever is moved in the direction to advance the slide and carry the nut onto the rotating tap by means of a spring $n$. In the slide M and in alinement with the hole of a nut blank resting on the shelf $m$, is a hole $m'$ which at its right end is bent down through the bottom of said slide. The chips produced in the threading operation will be forced into this hole, and will drop out of its rear end.

The portion of the slide M on which the shelf $m$ is formed is a trifle wider than the width of a nut; and this end, as the slide is moved back and forth, travels between the vertical guide walls R, R which prevent the nut from turning when it is being tapped. In these guide walls are two spring fingers Q, having beveled ends which project into the slide way between these walls R, being pressed inward by springs $q$. These fingers engage with the nut as the slide is being advanced and force the nut back against the vertical wall on the slide behind shelf $m$.

The shaft P receives its motion from the spindle B through a train of reducing gears 1, 2, 3, 4 of which gear 1 is on the spindle B and gear 4 is on shaft P. The shaft P is frictionally connected with an alined shaft P'—that is to say, there is a friction coupling L, of any suitable construction, by which when shaft P' is unrestrained, it will be turned by shaft P. On the shaft P' is a pinion $p$, which meshes with a gear $c'$ on the head C. The head, however, is provided with two projections $c^3$ $c^4$ placed at diametrically opposite points and in different transverse planes. A detent lever U is suitably pivoted and projects into the housing D and may be engaged by either of these lugs $c^3$, $c^4$. This lever has at its lower end a pin $u$ going into a cam groove $v'$ on a disk $v$ fixed to a shaft V. This cam groove extends for about half of the circumference of the disk in one transverse plane and for the other half in another transverse plane, and these two parts of the cam groove are joined by inclines at diametrically opposite points as shown in Fig. 1. Therefore, at the end of each half revolution of the shaft V the lever U shifts its position. When its upper end is moved to the right, it is brought into the plane in which the lug $c^4$ is traveling, and in moving to this position it moves out of the way of the lug $c^3$. Thereupon the shaft P' will be turned through the friction coupling, referred to, and it will turn the head C one-half of a revolution until the lug $c^4$ engages with the lever U and then it will stop. This brings the tap spindle G' into line with the nut on the shelf $m$.

The shaft V is turned slowly by means of a ratchet wheel $v^2$ secured to its end, and the pawl $v^3$ hung on the pivot joint of a lever $x$ which is rotatably mounted upon shaft V, while the link $x'$ embraces an eccentric attached to a gear W. This gear meshes with a pinion $b^3$ upon the spindle B.

Secured to the shaft V is a disk $v^5$ having in it two notches $v^4$ see Figs. 1 and 3. A rock shaft Y, which lies parallel with the shaft P, P', has an arm $y$ adapted to engage with the face of this disk, and to drop into these notches. At the other end of this rock shaft is another arm $y'$. A latch Z is pivoted in a position where it may enter a notch in the rear end of the slide M; and one end of this latch is connected by a link $z'$ with the arm $y'$.

The operation of the described mechanism is as follows: One tap (G, for example) is in constant rotation in alinement with the hole of the nuts as they successively fall from the nut chute onto the shelf $m$. Then the slide M is moved forward by the spring-actuated lever $n$, and the nut pressed against the rotating tap which cuts the thread in the hole; and since the nut cannot rotate, the threaded part of the tap goes entirely through the nut, leaving the nut on the unthreaded shank of the tap,—which is of smaller diameter than the threaded part. The slide then returns and receives another nut which is moved forward, and it is threaded onto the tap; and these operations are repeated until there will be as many threaded nuts on the shank of the tap as it will conveniently hold. While these operations have been going on the shaft V has been slowly turned until the lever U is moved to release the head C. Thereupon this head is turned by the mechanism described one-half of a revolution or until the lug $c^4$ strikes the lever U. This brings the other tap G', into working position, in which it gets loaded up with threaded nuts in the manner described. While this is going on an attendant by loosening set screw $g'$ disconnects the tap G from the spindle and lets the threaded nuts run off the rear end of said tap shank. He then replaces the tap and fastens it in so that it is ready to do its part of the work when the head makes its next half revolution. It will be noticed, however, that when the pin $u$ is in the inclined part of the cam groove $v'$ the arm $y$ will be engaging in one of the depressions $v^4$, because the rock shaft Y will be rocked by a spring $y^3$, and this will cause latch Z to engage in the notch in the slide M and prevent the operation of said slide. That is to say, the slide ceases to operate during that interval of time when the head C is shifting its position. When the position of the head has been shifted, the shaft V will have been turned so that the disk $v^5$ will rock rock shaft Y in the reverse direction and withdraw the latch Z from its engagement with the slide. Holding back the slide M in the manner described or by any other suitable means does not affect the operation of the rest of the mechanism, because it simply prevents the slide from moving in that direction in which it is ordinarily moved by the spring $n$.

Having described my invention, I claim:

1. In a nut tapping machine, the combination of a rotatable head, a plurality of tap spindles rotatably mounted therein with their axes parallel with the axis of said head, a reciprocatable feed slide movable in a path parallel with said spindles, mechanism for feeding a nut to be tapped to said slide, mechanism for automatically moving said head to and holding it for a time first in a position in which one spindle is alined with said nut and then to a position in which another spindle is so alined with said nut, mechanism for reciprocating said slide, timing mechanism controlling the movement of said head relative to the movement of the slide, whereby the slide will reciprocate a plurality of times in the interval between movements of said head, and mechanism by which to rotate the spindle which is temporarily alined with the nuts upon said slide.

2. In a nut tapping machine, the combination of a rotating gear F, a head rotatable upon an axis eccentric to said gear, a plurality of tap spindles rotatably mounted in said head on axes which are parallel to the axis of said head and at equal distances therefrom, pinions secured to said tap spindles and adapted to successively engage with said gear F when moved into working position, mechanism for turning said head to successively bring said tap spindles into working position, a nut-carrying slide movable toward and from the tap secured to that spindle which is in working position, and two side walls, between which said slide moves, for engaging with the sides of the nuts to prevent their rotation while being threaded by said tap, with means for periodically releasing the head and allowing it to be partially rotated and other means for stopping the nut-carrying slide while the head is changing position.

3. In a nut tapping machine, the combination of a rotatable head, a plurality of tap spindles rotatably mounted therein with their axes parallel with the axis of said head, mechanism by which one only of said tap spindles which is in operative position is rotated, a constant friction drive for turning said head, and a rotatable shaft and a cam thereon, a movable stop actuated by said cam and adapted to engage with said head to stop it from turning under said friction drive or to release it for partial rotation.

4. In a nut tapping machine, the combination of a rotatable head, a plurality of tap spindles rotatably mounted therein with their axes parallel with the axis of said head, mechanism by which one only of said tap spindles is rotated, a constant friction drive for turning said head, lugs on said head corresponding in number to the tap spindles, a movable stop adapted to engage with any lug depending upon its position, and mechanism for periodically changing the position of said stop out of the path of an engaged lug allowing it to move on and into the path of the next lug which it engages to stop the rotation of the head.

5. In a nut tapping machine, the combination of a rotatable head, a plurality of tap spindles rotatably mounted therein with their axes parallel with the axis of said head, mechanism by which one only of said tap spindles is rotated, a friction drive for turning said head, lugs on said head corresponding in number to the tap spindles and set alternately in two planes, a cam having grooves extending part way around it, lying in different transverse planes and connected by inclined grooves with a movable stop adapted to engage the lugs on the rotatable head and provided with a pin which projects into said grooves on the cam, and mechanism for slowly turning said cam.

6. In a nut tapping machine, the combination of a rotating spindle carrying a gear, a cylindrical housing surrounding said spindle but eccentric thereto, a cylindrical head rotatably mounted in said housing and having an external gear, a plurality of tap spindles mounted in said head on axes parallel with its axis and at equal distances therefrom, pinions secured to the rear ends of said tap spindles, a shaft having a gear engaging with the gear on said head, a friction drive for said shaft, and mechanism which periodically permits said head to be turned through a part of one revolution only through said friction drive, or engages and holds it against the slip of said friction drive.

7. In a nut tapping machine, the combination of a nut chute, a reciprocating slide having a shelf which in the retracted position of said slide lies beneath the discharge end of said chute, a spring for advancing said slide, a cam for retracting it, and a latch adapted to hold the slide in a retracted position.

8. In a nut tapping machine, the combination of a nut chute, a reciprocating slide having a shelf which in the retracted position of said slide lies beneath the discharge end of said chute, a spring for advancing said slide, a cam for retracting it, a latch adapted to hold the slide in a retracted position, and means for automatically operating said latch.

9. In a nut tapping machine, the combination of a nut chute, a reciprocatable feed slide, a spring for advancing said slide, a cam for retracting it, a latch adapted to hold the slide in a retracted position, a rotatable head, two tap spindles rotatably mounted therein, means whereby the head may be held in either of two positions in which the two tap spindles are respectively alined with nuts, and mechanism for turning said head periodically, and means whereby the latch is caused to engage said slide while the head is shifting its position.

10. In a nut tapping machine, the combination of a reciprocatable slide, a spring for advancing it, a cam for retracting it, a latch adapted to engage with said slide and hold it in a retracted position, a rock shaft, connections between the rock shaft and latch, an arm on the rock shaft, and a rotatable disk having notches with which said arm engages.

11. In a nut tapping machine, the combination of a rotatable head, a plurality of tap spindles rotatably mounted therein with their axes parallel with the axis of said head, mechanism by which one only of said tap spindles is rotated, a friction drive for turning said head, a plurality of lugs on said head corresponding in number to the tap spindles and disposed alternately in two planes, a movable lever adapted to engage at one end with either lug depending upon its position, a cam having two grooves extending part way around it and lying in different transverse planes, inclined grooves connecting said grooves, mechanism for slowly turning said cam, a pin on said lever projecting into said grooves, a reciprocating nut carrier, a spring for advancing it, a cam for retracting it, a disk connected with said cam disk and having peripheral notches, a rock shaft having one arm which engages with the periphery of said notched disk, a spring actuating the rock shaft in one direction, a latch adapted to engage with said slide and hold it in a retracted position, a second arm on said rock shaft, and connections between said latch and the latter arm.

12. In a nut tapping machine the combination of a head having a plurality of tap spindles rotatably mounted therein with their axes parallel, a reciprocatable nut feeding slide movable in a path parallel with said spindles, means for automatically moving said head to and holding it for a time in a position in which one of said spindles is alined with the nut feed and for then moving it to a position in which a second spindle is in tapping position, and mechanism for reciprocating said slide, timing mechanism controlling the movement of said head relative to the movement of the slide whereby the slide will reciprocate a plurality of times in the interval between said movements of the head.

13. In a nut tapping machine the combination of a head having a plurality of tap spindles rotatably mounted therein with their axes parallel, a reciprocatable nut feeding slide movable in a path parallel with said spindles, means for automatically moving said head to and holding it for a time in a position in which one of said spindles is alined with the nut feed and for then moving it to a position in which a second spindle is in tapping position, and mechanism for reciprocating said slide, timing mechanism controlling the movement of said head relative to the movement of the slide whereby the slide will reciprocate a plurality of times in the interval between said movements of the head, and means automatically rotating the spindle which is in tapping position.

14. In a nut tapping machine the combination of a head, a plurality of tap spindles rotatably mounted therein, means for moving the head to and holding it in different positions in which the tap spindles are successively in working position, means for automatically rotating the tap spindle in working position, feeding means for presenting nuts to the tap in working position, and controlling means for said feeding means timed in relation to the means for moving the head to cause the feeding of a plurality of nuts to the working spindle before it is moved from working position.

In testimony whereof, I hereunto affix my signature in the presence of two witnesses.

ROY H. SMITH.

Witnesses:
E. L. THURSTON,
E. B. GILCHRIST.